United States Patent
Dong et al.

(10) Patent No.: US 11,651,002 B2
(45) Date of Patent: May 16, 2023

(54) METHOD FOR PROVIDING INTELLIGENT SERVICE, INTELLIGENT SERVICE SYSTEM AND INTELLIGENT TERMINAL BASED ON ARTIFICIAL INTELLIGENCE

(71) Applicant: BEIJING BAIDU NETCOM SCIENCE AND TECHNOLOGY CO., LTD., Beijing (CN)

(72) Inventors: Daxiang Dong, Beijing (CN); Jun Zhang, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 16/193,454

(22) Filed: Nov. 16, 2018

(65) Prior Publication Data
US 2019/0087472 A1     Mar. 21, 2019

Related U.S. Application Data (63) Continuation of application No. PCT/CN2016/097292, filed on Aug. 30, 2016.

(30) Foreign Application Priority Data

May 17, 2016 (CN) .......................... 201610327170.X (51) Int. Cl.
*G06F 16/248* (2019.01)
*G06F 16/33* (2019.01)
(Continued)

(52) U.S. Cl.
CPC .............. *G06F 16/248* (2019.01); *G06F 7/16* (2013.01); *G06F 16/24578* (2019.01);
(Continued)

(58) Field of Classification Search
CPC .............. G06F 16/248; G06F 16/3344; G06F 16/24578; G06F 7/16; G06F 16/3329; G06F 16/3326; G06N 3/08
See application file for complete search history.

(56) References Cited

U.S. PATENT DOCUMENTS 7,610,306 B2    10/2009   Lin et al.
8,838,169 B2 *   9/2014   Vendrow ................. H04M 3/54
                                                   455/555
(Continued)

FOREIGN PATENT DOCUMENTS

CN       1920818 A     2/2007
CN    101178711 A     5/2008
(Continued)

OTHER PUBLICATIONS

International Patent Application No. PCT/CN2016/097292; International Search Report and Written Opinion dated Jan. 26, 2017; 5 pgs. (relevance found in English citations).

*Primary Examiner* — Vaishali Shah
(74) *Attorney, Agent, or Firm* — Cozen O'Connor (57) ABSTRACT

A method for providing an intelligent service, an intelligent service system and an intelligent terminal based on artificial intelligence. The method comprises: receiving a first service request from a user (102); determining a search term and the weight thereof for the first service request (104); providing a first service result according to the search term and the weight thereof (106); and collecting feedback information for the first service result from the user, and adjusting, in real time, the search term and/or the weight thereof for the first service request, according to evaluation information in the feedback information (108).

21 Claims, 7 Drawing Sheets

(51) Int. Cl.
*G06F 16/332* (2019.01)
*G06F 16/2457* (2019.01)
*G06F 7/16* (2006.01)
*G06N 3/04* (2023.01)
*G06N 3/08* (2023.01)

(52) U.S. Cl.
CPC ...... *G06F 16/3326* (2019.01); *G06F 16/3334* (2019.01); *G06N 3/04* (2013.01); *G06N 3/08* (2013.01)

(56) References Cited

U.S. PATENT DOCUMENTS

| | | | | |
|---|---|---|---|---|
| 9,858,917 | B1* | 1/2018 | Strope | G10L 15/10 |
| 9,864,781 | B1* | 1/2018 | Batra | G06F 16/24578 |
| 2003/0132944 | A1* | 7/2003 | Smith | G06F 16/29 |
| | | | | 345/581 |
| 2004/0008828 | A1* | 1/2004 | Coles | H04M 3/4936 |
| | | | | 379/88.01 |
| 2005/0049986 | A1* | 3/2005 | Bollacker | G06Q 10/04 |
| | | | | 706/46 |
| 2005/0198026 | A1* | 9/2005 | Dehlinger | G06F 40/56 |
| | | | | 707/999.005 |
| 2006/0206454 | A1* | 9/2006 | Forstall | G06F 16/951 |
| 2006/0224572 | A1* | 10/2006 | Price | G06F 16/3335 |
| 2007/0168344 | A1* | 7/2007 | Brinson | G06F 16/3326 |
| | | | | 707/999.005 |
| 2007/0288445 | A1* | 12/2007 | Kraftsow | G06F 16/3338 |
| 2009/0192985 | A1* | 7/2009 | Bolls | G06F 16/3326 |
| 2009/0199130 | A1* | 8/2009 | Tsern | G04G 21/08 |
| | | | | 715/810 |
| 2010/0023514 | A1* | 1/2010 | Parikh | G06F 40/242 |
| | | | | 707/E17.001 |
| 2010/0153094 | A1 | 6/2010 | Lee et al. | |
| 2011/0004588 | A1* | 1/2011 | Leitersdorf | G06F 16/951 |
| | | | | 707/711 |
| 2011/0157029 | A1* | 6/2011 | Tseng | G06F 3/04883 |
| | | | | 345/173 |
| 2012/0330693 | A1* | 12/2012 | Ciabrini | G06Q 50/14 |
| | | | | 705/26.7 |
| 2013/0018872 | A1* | 1/2013 | Velipasaoglu | G06F 16/90324 |
| | | | | 707/723 |
| 2016/0165472 | A1* | 6/2016 | Gopalakrishnan | H04W 40/28 |
| | | | | 455/67.11 |
| 2016/0224569 | A1* | 8/2016 | Cuddihy | G06F 16/3322 |
| 2016/0291831 | A1* | 10/2016 | Baek | G06F 3/04817 |
| 2017/0023637 | A1* | 1/2017 | Yang | G06F 11/2733 |
| 2017/0092153 | A1* | 3/2017 | Horbal | G06F 3/0393 |
| 2017/0300581 | A1* | 10/2017 | Westbrook | G06F 16/9535 |
| 2017/0329778 | A1* | 11/2017 | Allen | G06N 5/02 |
| 2018/0123403 | A1* | 5/2018 | Kare | G01S 17/04 |
| 2018/0240058 | A1* | 8/2018 | Vandersee | G06Q 10/06313 |

FOREIGN PATENT DOCUMENTS

| | | |
|---|---|---|
| CN | 101334796 A | 12/2008 |
| CN | 101685454 A | 3/2010 |
| CN | 102387207 A | 3/2012 |
| CN | 104699708 A | 6/2015 |

* cited by examiner

METHOD FOR PROVIDING INTELLIGENT SERVICE, INTELLIGENT SERVICE SYSTEM AND INTELLIGENT TERMINAL BASED ON ARTIFICIAL INTELLIGENCE

CROSS-REFERENCE TO RELATED APPLICATIONS

This is a continuation of International Application PCT/CN2016/097292, with an international filing date of Aug. 30, 2016, which claims priority to Chinese Patent Application no. 201610327170.X, filed with China National Intellectual Property Administration (CNIPA) on May 17, 2016, the contents of which are incorporated herein by reference in their entirety.

TECHNICAL FIELD

The present disclosure relates to the field of artificial intelligence, and more specifically to an artificial intelligence based method, intelligent service system and intelligent terminal for providing intelligent service.

BACKGROUND

Artificial intelligence (AI) is a new technical science on research and development of theories, methodologies, technologies and application systems for simulating and extending human intelligence. Artificial intelligence is a branch of computer science, attempts to understand the essence of intelligence and produce a new intelligent machine that may make a response in a manner similar to human intelligence. The research in this field includes robots, speech recognition, image recognition, natural language processing, expert systems, etc.

Currently, in the field of application Apps for intelligent terminals such as PCs, notebook computers, smart phones, and tablets, various artificial intelligence based intelligent service systems (often referred to as smart personal assistants) have emerged. Users may interact with the intelligent service systems in a question-and-answer session. For example, the user may input requests to query about nearby restaurants, query about movies released recently, and order takeaways, while the system usually provides service to the user through searching (including correlation calculation, manual strategy, etc.)

Some intelligent service systems may have built-in feedback function for collecting user satisfaction to train and improve the systems. However, the collection of user feedback and the training and improving of the systems by these intelligent service systems are all performed offline, and there is at least the problem that the information collected offline is not real-time dynamic data. That is to say, in a long time interval, data used for system training and learning remains unchanged, such that a first service result obtained by the user is changeless, which lowers the search accuracy and greatly affects the user experience.

The above information disclosed in the Background is only for enhancing understanding of the background of the present disclosure. Thus, it may contain information that does not form the prior art known to those of ordinary skill in the art.

SUMMARY

In view of this, embodiments of the present disclosure is to provide an artificial intelligence based method for providing intelligent service, intelligent service system and intelligent terminal, to at least solve the problems in the existing technology.

The technical solution of the embodiments of the present disclosure is implemented as follows:

According to an embodiment of the present disclosure, an artificial intelligence based method for providing intelligent service is provided, including: receiving a first service request of a user; determining a search term and a weight of the search term for the first service request; providing a first service result based on the search term and the weight of the search term; and collecting feedback of the user on the first service result, and adjusting at least one of the search term or the weight of the search term for the first service request in real time based on evaluation information in the feedback.

Preferably, the method may be implemented on an intelligent terminal or a remote server.

Preferably, the evaluation information in the feedback may be a score or positive or negative feedback.

Preferably, increasing and saving the weight of the search term for the first service request, when the evaluation information in the feedback is positive feedback or the score is greater than or equal to a predetermined threshold.

Preferably, the method may further include: providing a new first service result immediately based on the real-time adjusted at least one of the search term or the weight of the search term, when the evaluation information in the feedback is negative feedback or the score is lower than a predetermined threshold.

Preferably, the adjusting at least one of the search term or the weight of the search term in real time may include: determining whether there is one or more other service requests other than the first service request within a predetermined time period prior to the first service request of the user, when the evaluation information in the feedback is negative feedback or the score is lower than the predetermined threshold; and adjusting, when the one or more other service requests exist, at least one of the search term or the weight of the search term for the first service request in real time, based on the negative feedback or the score, in conjunction with at least one search term in the one or more other service requests.

Preferably, the determining a search term and a weight of the search term may include: acquiring at least one of real-time status information or historical information of the user; and determining the search term and the weight of the search term based on a content of the first service request and the acquired at least one of the real-time status information or the historical information of the user.

Preferably, the determining the search term and the weight of the search term may include: performing an abstract space representation on the first service request based on the content of the first service request and the acquired at least one of the real-time status information or the historical information of the user; selecting, based on the first service request, a database retrieval mode for screening the first service result; and merging an abstract space representation of the first service request with an abstract space representation of the database retrieval mode to obtain the search term and the weight of the search term.

Preferably, the first service result is a list composed of a plurality of first service result entries, and reordering the first service result entries in the list in real time and providing the reordered list immediately, based on the real-time adjusted at least one of the search term or the weight of the search term, when the score of the feedback of the user on at least one of the first service result entries in the list is lower than the predetermined threshold or the feedback is negative.

According to another embodiment of the present disclosure, an artificial intelligence based intelligent service system is provided, including: a request receiving module, configured to receive a first service request of a user; an enhanced learning module, configured to determine a search term and a weight of the search term for the first service request; a service processing module, configured to provide a first service result based on the search term and the weight of the search term; and a feedback functioning module, configured to collect feedback of the user on the first service result to obtain evaluation information in the feedback; wherein the enhanced learning module is further configured to adjust at least one of the search term or the weight of the search term for the first service request in real time based on the evaluation information in the feedback.

Preferably, the evaluation information in the feedback may be a score or positive and negative feedback.

Preferably, the enhanced learning module may be configured to: increase and save the weight of the search term for the first service request, when the evaluation information in the feedback is positive feedback or the score is greater than or equal to a predetermined threshold.

Preferably, the service processing module may be further configured to provide a new first service result immediately based on the real-time adjusted at least one of the search term or the weight of the search term, when the evaluation information in the feedback is negative feedback or the score is lower than a predetermined threshold.

Preferably, the enhanced learning module may be configured to: determine whether there is one or more other service requests other than the first service request within a predetermined time period prior to the first service request of the user, when the evaluation information in the feedback is negative feedback or the score is lower than the predetermined threshold; and adjust, when the one or more other service requests exist, at least one of the search term or the weight of the search term for the first service request in real time, based on the negative feedback or the score, in conjunction with at least one search term in the one or more other service requests.

Preferably, the enhanced learning module may be further configured to: acquire at least one of real-time status information or historical information of the user; and determine the search term and the weight of the search term based on a content of the first service request and the acquired at least one of the real-time status information or the historical information of the user.

Preferably, the enhanced learning module may be configured to: perform a text abstract space representation on the first service request based on the content of the first service request and the acquired at least one of the real-time status information or the historical information of the user; select, based on the first service request, a database retrieval mode for screening the first service result based on the first service request; and merge the text abstract space representation with an abstract space representation of the database retrieval mode to obtain the search term and the weight of the search term.

Preferably, the first service result is a list composed of a plurality of first service result entries, and the service processing module is configured to reorder the first service result entries in the list in real time and provide the reordered list immediately, based on the real-time adjusted at least one of the search term or the weight of the search term, when the score of the feedback of the user on at least one of the first service result entries in the list is lower than the predetermined threshold or the feedback is negative.

According to yet another embodiment of the present disclosure, an artificial intelligence based intelligent terminal is provided, including an interface device interacting with a user and a compiling device connected to the interface device, the compiling device including: a memory; and a processor connected to the memory; the processor is configured to receive a first service request of a user; determine a search term and a weight of the search term for the first service request; provide a first service result based on the search term and the weight of the search term; and collect feedback of the user on the first service result, and adjust at least one of the search term or the weight of the search term for the first service request in real time based on evaluation information in the feedback.

The artificial intelligence based method for providing intelligent service, intelligent service system and intelligent terminal according to the embodiments of the present disclosure can collect feedback of the user for a service result in real time (for example, including positive feedback such as "like" and negative feedback such as "dislike"), and adjust the system parameters in real time based on the feedback to obtain a new search term, a new weight of the search term, or both. This enables real-time training and improvement of the system, thereby improving search accuracy.

This section is intended to provide an overview of the subject of the present patent disclosure. This section is not intended to provide an exclusive or exhaustive description of the present disclosure. This text includes a detailed description to provide further information regarding the present patent disclosure.

BRIEF DESCRIPTION OF THE DRAWINGS

In the accompanying drawings (the drawings are not necessarily drawn to scale), the same numbers can describe similar components in different views. The same numbers with different letter suffixes can represent different examples of similar components. The accompanying drawings summarize, by way of example rather than limitation, the various embodiments discussed in the present disclosure.

DETAILED DESCRIPTION OF EMBODIMENTS

In the following, only certain exemplary embodiments are described briefly. The described embodiments may be modified in various different methods, without departing from the spirit and scope of the present disclosure, as those skilled in the art may recognize. Accordingly, the accompanying drawings and the description are considered exemplary in nature and not limiting.

In the embodiments of the present disclosure, the intelligent service system interacts with the user (and preferably with the server database or the intelligent terminal used by the user), parses the content of a first service request inputted by the user (and preferably, in combination with the user's real-time status data and/or historical data, for example, the user's current status, the user's current geographic location, the user's gender, the user's age, the local time of the user's location, the user's behavior log, etc.) to obtain a search term, collects feedback of the user on the first service result in real time (for example, including positive feedback such as "like" and negative feedback such as "dislike"), and adjusts system parameters in real time based on the feedback to obtain a new search term, a new weight of search term, or both. This enables real-time training and improvement of the system, thereby improving search accuracy. Preferably, where negative feedback is collected and the user is still on the current searching service interface, the system may immediately provide a new first service result based on the new search term and/or the weight of the new search term. In this way, when the user is dissatisfied with the search result, the system can timely collect effective feedback that the user is not satisfactory with the search result, thereby immediately optimizing the first service result to improve the user experience.

Figure 1:
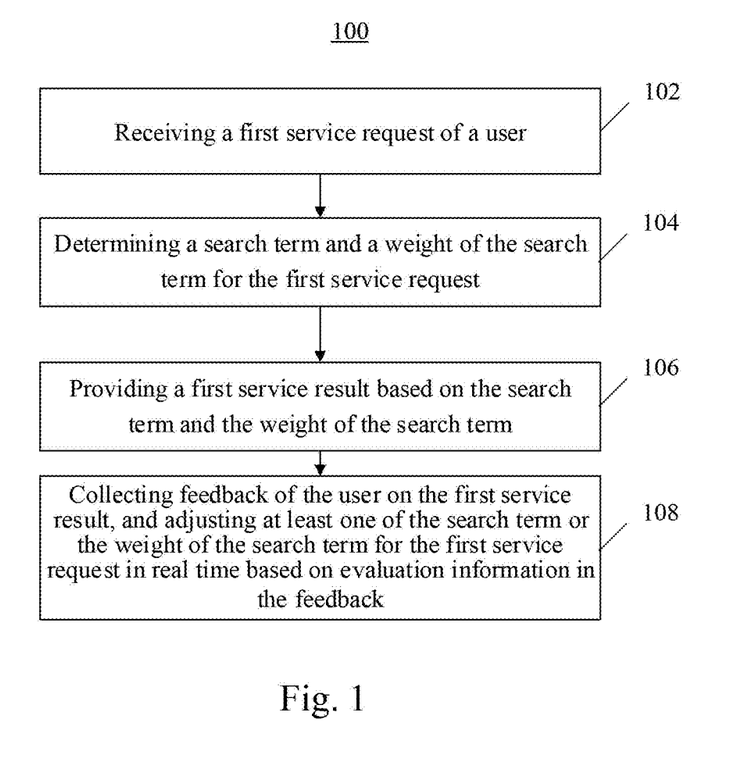
FIG. 1 illustrates a flowchart of an artificial intelligence based method 100 for providing intelligent service according to an embodiment of the present disclosure.

FIG. 1 illustrates a flowchart of an artificial intelligence based method 100 for providing intelligent service according to an embodiment of the present disclosure. The method is implemented by an artificial intelligence based intelligent service system specifically described below. In an example, all steps of the method may be implemented on an intelligent terminal (e.g., by an application App pre-installed therein) such as a PC, laptop, smart phone, or tablet. In another example, all or some of the steps may also be implemented by a remote computer device (e.g., a remote server) communicatively connected to the intelligent terminal, while the App installed in the intelligent terminal or the search page displayed in the web browser may be used only as an interface interact with the user or implement part of the steps.

As shown in FIG. 1, the method 100 includes the following steps:

In step 102, receiving a first service request of a user.

In one example, the first service request may be at least one of a text request input, a voice request input, or a picture request input. In an example, the intelligent service system may also provide a list of services for the user to select, in this case, from the user's perspective, the first service request may be represented as a gesture of clicking on a certain service type in the list of services. In an example, from the user's perspective, the first service request may be represented as a further request for a service result provided by the system previously, for example, a gesture of clicking on a "View Details" link in the service result. This step is actually a process of the user proposing a question, for example, booking a plane ticket from Beijing to Shenzhen.

In step 104, determining a search term and a weight of the search term for the first service request.

The search term mentioned herein covers the meaning of the search term that is different from the prior art. Taking the first service request input in Chinese text as an example, in the prior art, the search term is formed by dividing the input Chinese text according to a predetermined Chinese word segmentation algorithm, that is, the search term is extracted from the content of the first service request. However, in the present disclosure, the search term may not be limited to the content of the first service request. In an example, at least one of the user's real-time status information or the historical information may be acquired prior to determining the search term and weight of the search term. The real-time status information of the user may include the geographical location where the user is currently located, the gender of the user, the age of the user, the local time of the user's location, and the like. The intelligent service system may collect the real-time status information of the user from the server database and/or the intelligent terminal currently used by the user, to predict the current needs of the user more accurately. The historical information of the user may include the page viewed by the user, the length of the page, the browsing time, the search log of the user, and the like. The intelligent service system may collect the historical information of the user from the intelligent terminal currently used by the user, to predict the user's interest and preference more accurately. Thereby, the intelligent service system may determine the search term and the weight of the search term based on the content of the first service request and the acquired real-time status information and/or historical information of the user. The specific implementation of determining the search term and weight of the search term will be described in detail below.

In step 106, providing a first service result based on the search term and the weight of the search term. The intelligent service system may use the search term and the weight of the search term to search or perform corresponding processing to return the first service result.

The first service result has different representations for different types of first service requests. For example, if the user asks "what restaurants are there nearby", the first service result is represented as a list of a plurality of restaurants near the user's geographic location. If the user asks "what is the weather like today", the first service result is represented as the weather information at the use's geographic location the same day.

In step 108, collecting feedback of the user on the first service result, and adjusting at least one of the search term or the weight of the search term for the first service request in real time based on evaluation information in the feedback.

The feedback of the user on the service result may be quantified to a score. The score of the feedback may be a score scored by the user for a certain service result, or may be a score for the behavior of the user for a certain service result based on a predetermined algorithm by the intelligent service system. In some cases, feedback may be simply divided into positive feedback and negative feedback. In the case of positive feedback (satisfied with the search result), the feedback may be expressed as like, speech (for example, the search result is very useful!), click on the search result (even if there is no order), click on the search result and order, etc. In the case of negative feedback (not satisfied with the search result), the feedback may be expressed as no operation on the search result for a long time, close a search result, close the search service, close the entire APP, speech (for example, the search result sucks!), change of topics, etc.

The feedback of the user on the service result (e.g., like/dislike) is retained in the artificial intelligence based intelligent service system. In short, when the user is satisfied with the service result, the intelligent service system may increase the weight of the search term. When the user is dissatisfied with the service result, the intelligent service system may reduce the weight of the current search term and start using a new search term. By learning the feedback of the user and adjusting the search term and/or the weight of the search term in real time, the intelligent service system may continuously screen out the results that the user may like, and filter out the results of low quality. In this way, the intelligent service system may continuously improve the quality of service, thereby improving user satisfaction and increasing system stickiness.

Figure 2:
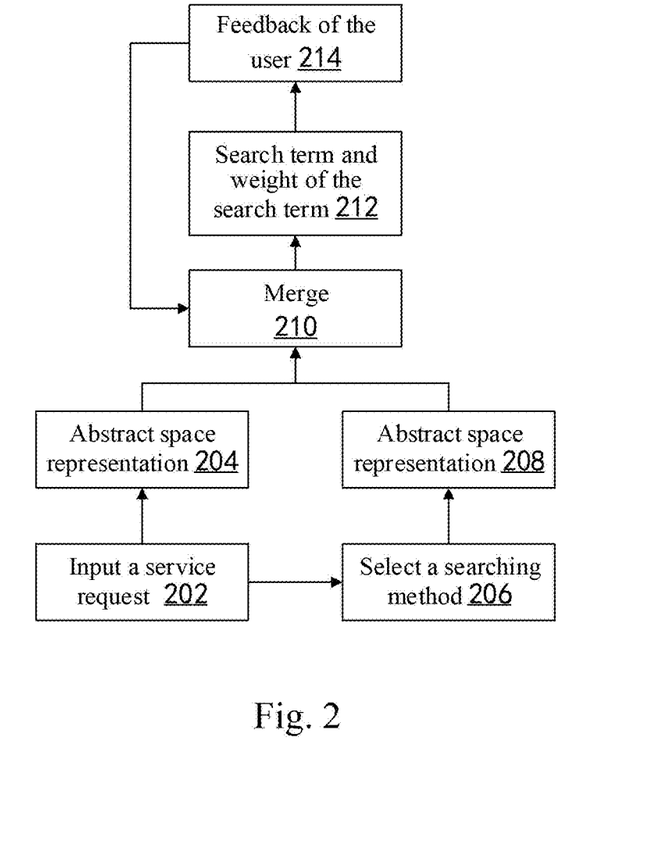
FIG. 2 illustrates a schematic diagram of a specific implementation of determining a search term and a weight of the search term.

FIG. 2 illustrates a schematic diagram of a specific implementation of determining a search term and a weight of the search term in the method 100 shown in FIG. 1. As described above, in order to improve the search accuracy, when the user inputs a service request 202, the intelligent service system may determine the search term and the weight of the search term based on the input information of the service request and the acquired real-time status information and/or historical information of the user. When determining the search term and the weight of the search term, the intelligent service system needs to perform an abstract space representation 204 on a keyword extracted from the content of the service request and the acquired real-time status information and/or historical information of the user. The neural network may be used to perform the abstract space representation. The keyword is transformed into a vector after the abstract space representation. In addition, a database retrieval mode 206 for screening service results may be selected based on the user's service request. The retrieval mode is a description of the method for screening the results in the database. Usually, the system may set multiple retrieval mode in advance according to the needs. Then, the abstract space representation 204 of the service request (i.e., the input vector) is merged 210 with an abstract space representation 208 of the database retrieval mode to obtain a search term 212 required for the system search, in which each search term may have a predetermined weight. When the user makes feedback 214 on the service result provided based on the search term and the weight of the search term, the system may adjust the search term and/or reduce/increase the weight of the search term in real time based on the feedback. Specifically, the feedback may be merged with the abstract space representation of the service request and the abstract space representation of the database retrieval mode to obtain a real-time adjusted search term and/or weight of the adjusted search term. Specifically, the system may update the parameters in the entire system by using a stochastic gradient descent method, so that the feedback from the user is the most positive.

Figure 3:
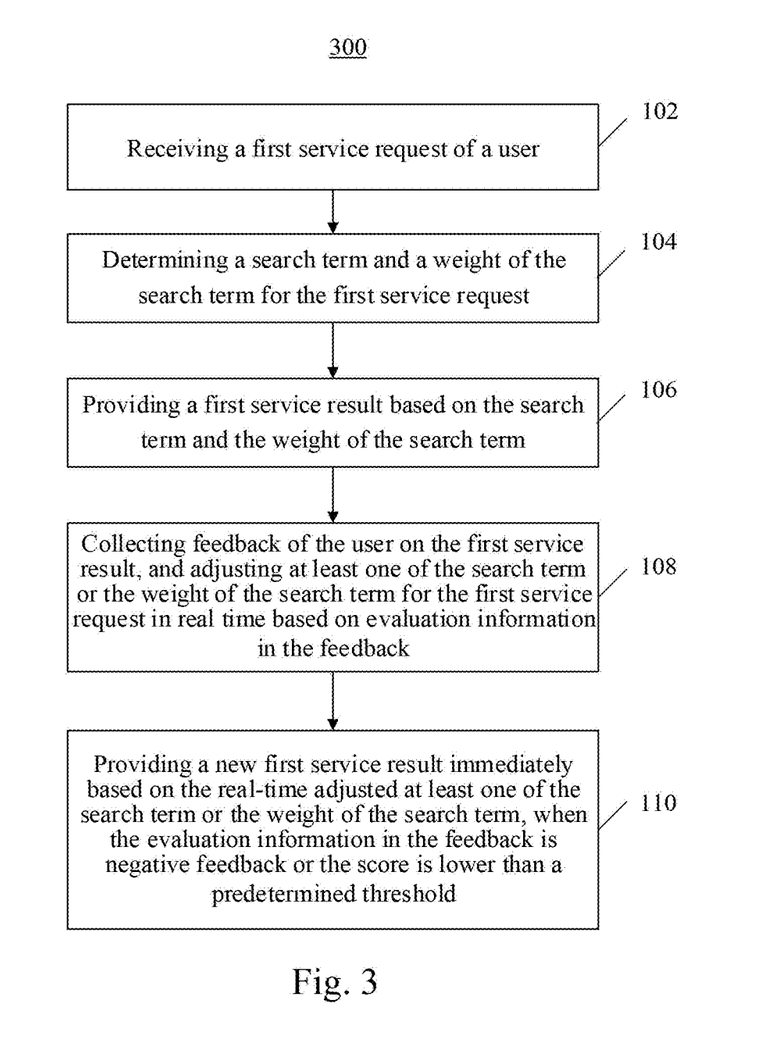
FIG. 3 illustrates a flowchart of an artificial intelligence based method 300 for providing intelligent service according to another embodiment of the present disclosure.

FIG. 3 illustrates a flowchart of an artificial intelligence based method 300 for providing intelligent service according to another embodiment of the present disclosure. In the present embodiment, the steps same as those of the method 100 shown in FIG. 1 use the same reference numerals, and detailed description thereof will be omitted. Only the steps different from those of the method 100 are described below.

In step 110, providing a new first service result immediately based on the real-time adjusted at least one of the search term or the weight of the search term, when the evaluation information in the feedback is negative feedback or the score is lower than a predetermined threshold.

For example, if the user is not satisfied with the current service result, the user may perform a laterally swiping gesture on the intelligent terminal to erase the current service result. At this time, if the user is still on the current search interface, the intelligent service system may provide a new service result. In an example, the user may continue to provide feedback on the new service result as the user receives a new service result. The intelligent service system continuously adjusts the search term and/or the weight by continuously collecting user feedback, and constitutes a closed-loop process of training, learning and continuous optimization, which may continuously improve the quality of the returned service result, to provide to the user the best answer through training and learning. Through this interaction, the intelligent service system greatly improves the probability of providing a satisfactory service result in a short period, thereby greatly improving the user experience.

In some cases, there are usage scenarios as follow: the user proposes a plurality of service requests to the intelligent service system within a certain period; accordingly, for each service request, the intelligent service system determines a corresponding search term and the weight of the corresponding search term and provides a corresponding service result. When the feedback of the user to one of the plurality of service results is negative feedback, the search term and/or the weight the search term for the corresponding service request is adjusted in real time in conjunction with the search term for at least one service request prior to the corresponding service request. In short, the intelligent service system may optimize, through training and learning, the search term and the weight of the search term for the user's current service request by combining the context of the dialogue between the user and the system. For example, the optimized search term may include keywords that are implicit but not present in the input information of the user's current service request.

In an example, the system may record the received service request of the user and the feedback as the historical information of the user for use in future intelligent services. Alternatively, the system may store an optimized neural network model for the user in the intelligent terminal of the user or remote server to provide personalized intelligent services to the user in future.

In an example, the system may collect service requests and feedback from multiple users, and update the database retrieval mode in real time based on the collected service requests and feedback from the multiple users. In this way, the intelligent service system may be generally optimized as the number of uses increases, thereby continuously improving the user experience.

Figure 4A:
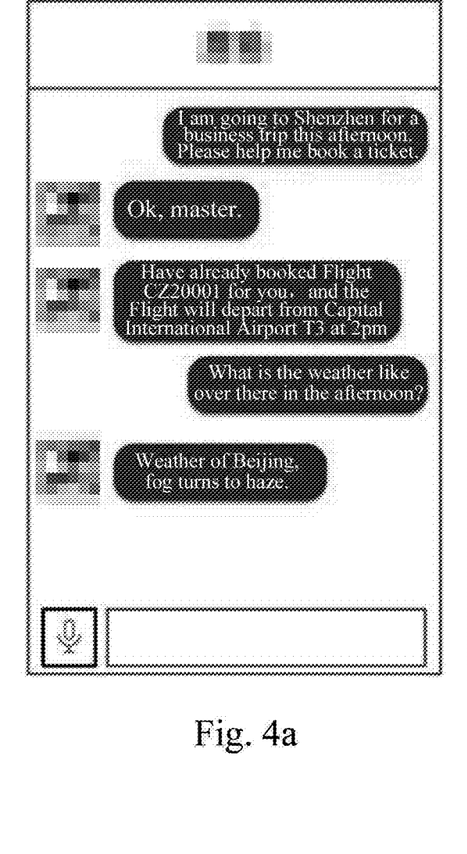
FIGS. 4a-4c illustrate schematic diagrams of an application example of the artificial intelligence based method for providing intelligent service according to another embodiment of the present disclosure.
Figure 4B:
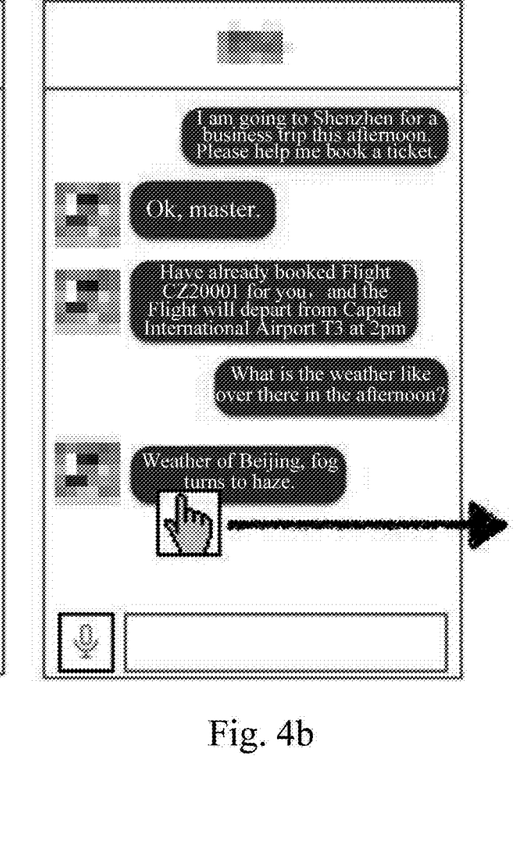

FIG. 4 illustrates a schematic diagram of an application example of the artificial intelligence based method for providing intelligent service according to another embodiment of the present disclosure. As shown in FIGS. 4a and 4b, the user and the system have the following dialogue through the interface of the App installed on the intelligent terminal:

User: I am going to Shenzhen for a business trip this afternoon. Please help me book a ticket.

System: . . . (complete the action of booking a ticket)

User: What is the weather like over there in the afternoon?

System: Weather of Beijing, fog turns to haze.

User: (erasing the result by gesture, indicating negative feedback)

Figure 4C:
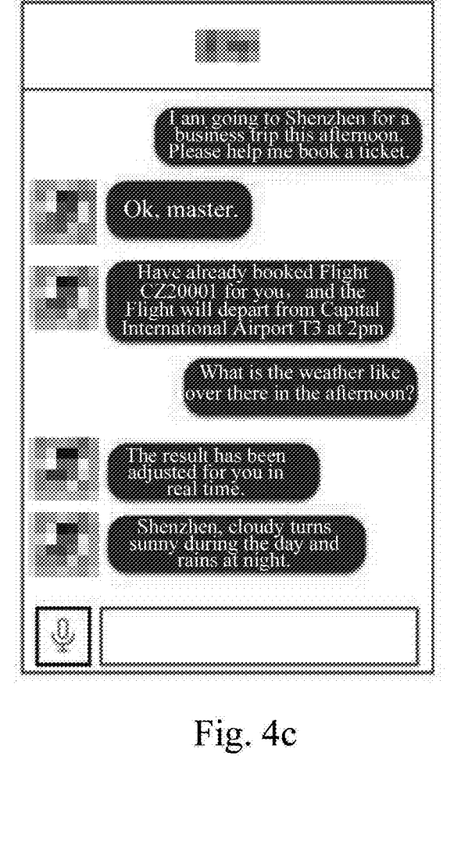

As shown in FIG. 4c, the system provides a new service result immediately after receiving the negative feedback:

System: The result has been adjusted for you in real time.

System: Shenzhen, cloudy turns sunny during the day and rains at night.

The working mechanism of the whole system is as follows:

A: Current key features are extracted based on the dialogue process between the user and the system, and search weights of the keywords are scored in real time using the existing enhanced learning neural network model. For example, the keywords and their search weights are: afternoon: 0.1, Shenzhen: 0.1, business trip: 0.3, ticket: 0.1, over there: 0.01, weather: 0.5, and location of the user (Beijing): 0.6.

B: The system replies the weather in Beijing because the predictive weights of the search terms tend to ask about the weather in Beijing.

C: After receiving negative feedback, the system updates the neural network model and re-scores the search terms. It should be noted that the search terms may be different each time, and the weights may also be different, but the model is more inclined to predict context-related words as the search terms.

D: Through the weight adjustment by the neural network, if the user gives negative feedback, the initial search terms with higher weights of the search terms, the weather, the location of the user (Beijing) are strongly suppressed, and the weights of the search terms with lower weights subject to relatively small suppression. At this time, the search terms and weights of the search term are predicted again using the enhanced learning model. The search terms and their weight become: afternoon: 0.09, Shenzhen: 0.09, business trip: 0.2, ticket: 0.09, over there: 0.009, weather: 0.1, and location of the user (Beijing): 0.12.

E: The system replies based on the latest predicted search terms and their weights. Shenzhen: cloudy turns sunny during the day and rains at night.

Here, the input of the whole enhanced learning neural network model is: the key features of the user's state, such as the keywords of the dialogue between the user and the system, the time and the location. In this example, afternoon, Shenzhen, please, help me, etc., may all be input as features. The output of the enhanced learning neural network model is (before update): afternoon: 0.1, Shenzhen: 0.1, business trip: 0.3, ticket: 0.1, over there: 0.01, weather: 0.5, and location of the user (Beijing): 0.6. The input and the output are generally associated, but not necessarily identical. Weights are also given through the entire neural network.

In addition, when the user provides positive feedback, the weights of the set of predictive words that obtain positive feedback are enhanced by the neural network, thereby enhancing the effect of the next prediction.

Figure 5:
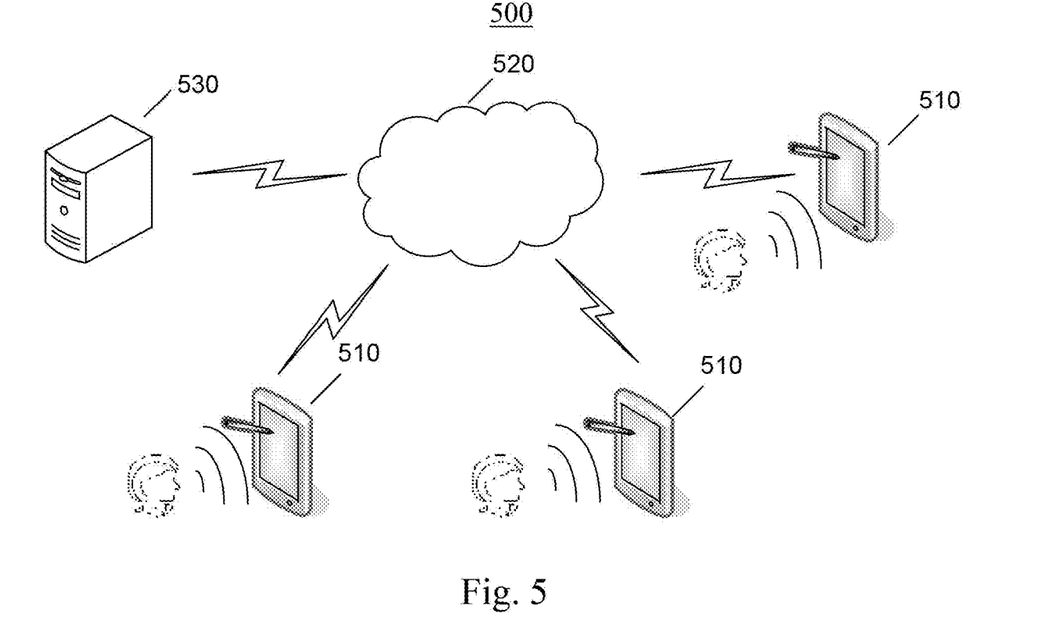
FIG. 5 is a schematic structural diagram of a physical architecture 500 of an artificial intelligence based intelligent service system implementing the embodiments of the present disclosure.

FIG. 5 is a schematic structural diagram of a physical architecture of an artificial intelligence based intelligent service system implementing the embodiments of the present disclosure. Referring to FIG. 5, an artificial intelligence based intelligent service system is shown. The system 500 includes an intelligent terminal 510 and one or more servers 530, the intelligent terminal 510 and the one or more servers 530 are connected through a network 520. The intelligent terminal 510 is installed with an intelligent service App or a web browser. The user accesses the intelligent service request interface by using the App or the web browser to make a service request to the system, receive the service result, and provide feedback on the service result.

Figure 6:
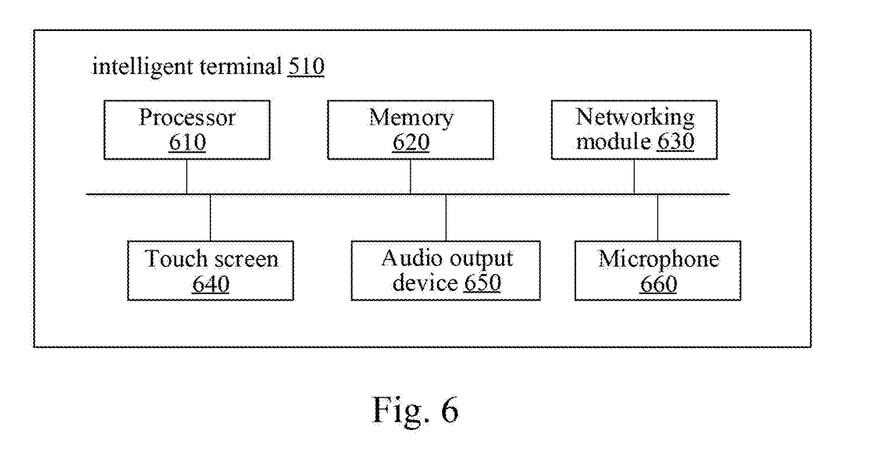
FIG. 6 is a block diagram of an artificial intelligence based intelligent terminal implementing the embodiments of the present disclosure.

The intelligent terminal 510 may be a smart phone, a PC, a tablet, a notebook, a smart robot, or the like. FIG. 6 is a block diagram of an artificial intelligence based intelligent terminal 510 implementing the embodiments of the present disclosure. The terminal 510 includes an interface device that interacts with the user, a compiling device that is connected to the interface device, and a networking module 630 that is connected to the compiling device. The interface device that interacts with the user may be a touch screen 640, an audio output device 650 (including a speaker, a headset, etc.), or a microphone 660. The compiling device may be a processor 610 or a memory 620. The processor 610 is configured to, in conjunction with other elements, perform all or some of the steps of the method of the embodiments of the present disclosure. The networking module 630 is configured to enable communication between the terminal 510 and the server 530, such as downloading service results from the server 530, and transmitting service requests to the server. The memory 620 is configured to store information (e.g., text, speech, pictures, etc.) of the service results downloaded from the server. The touch screen 640 is configured to receive texts input by the user, recognize gestures of the user, and display the service requests of the user, the service results provided by the system, and other relevant information. The audio output device 650 is configured to play the service results and system prompt information. The microphone 660 is configured to collect speech information of the user.

Figure 7:
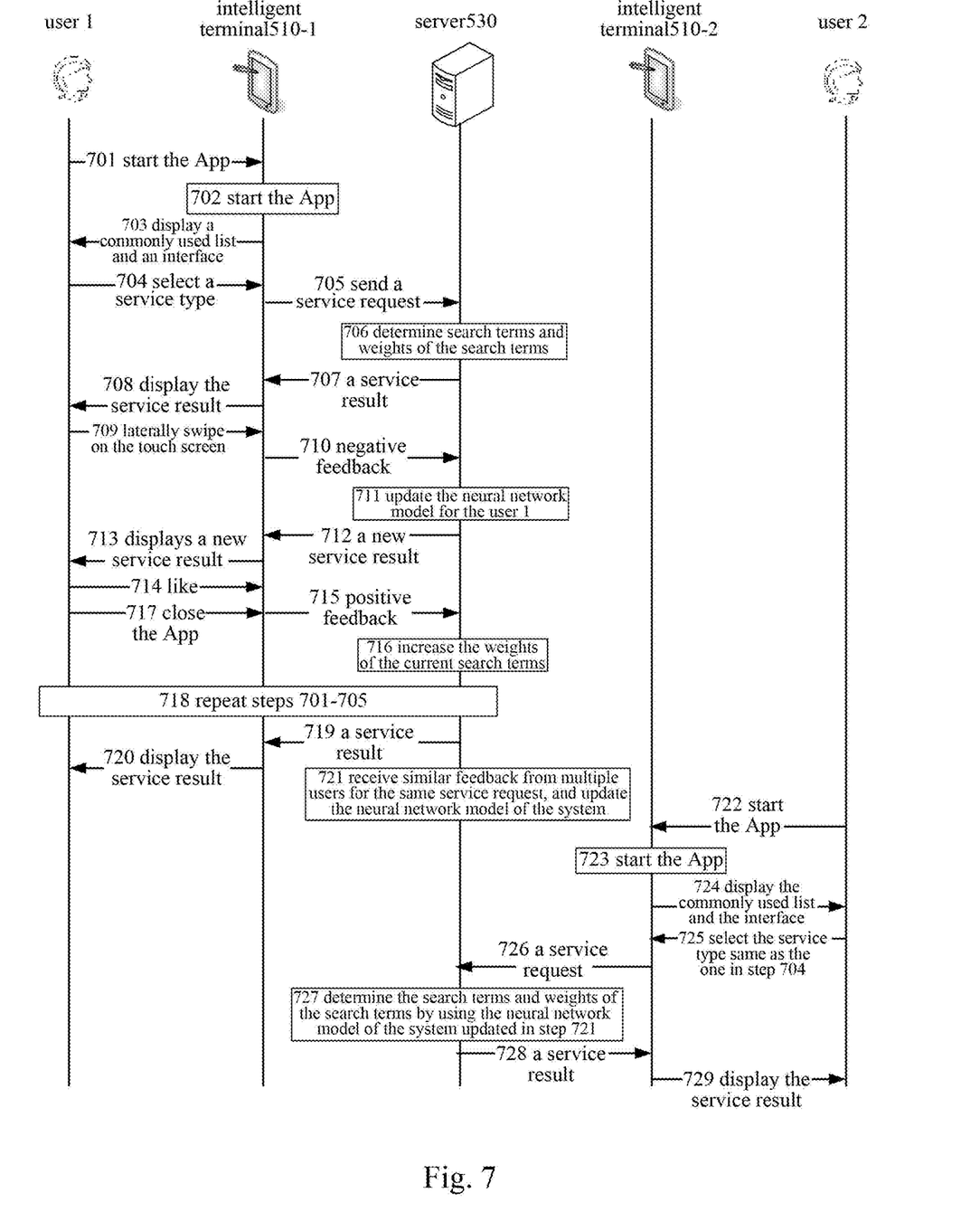
FIG. 7 is an interaction flowchart for implementing the method embodiment as shown in FIG. 3.

The interaction flow for implementing this embodiment is described below in conjunction with the method embodiment shown in FIG. 3. FIG. 7 is an interaction flowchart for implementing the embodiment. The interaction flow involves a user 1, an intelligent terminal 510-1 used by the user 1, a user 2, an intelligent terminal 510-2 used by the user 2, a server 530, and other users other than the user 1, the user 2, and intelligent terminals used by the other users (not shown). For convenience of description, here, the functions implemented by the intelligent terminal 510-1 and the intelligent terminal 510-2 are distinguished. It should be understood that these functions may be implemented on one intelligent terminal. The interaction flow includes the following steps:

Step 701: The user 1 starts the App by performing a tapping gesture on the touch screen of the terminal 510-1.

Step 702: The terminal 510-1 starts an App.

Step 703: The terminal 510-1 displays a commonly used service type list and a service request input interface.

Step 704: The user 1 selects a service type by performing a tapping gesture on the touch screen of the terminal 510-1.

Step 705: The terminal 510-1 sends a service request corresponding to the selected service type to the server 530.

Step 706: The server 530 determines search terms and weights of the search terms by a neural network model of the system.

Step 707: The server 530 returns a service result to the terminal 510-1 based on the search terms and weights of the search terms.

Step 708: The terminal 510-1 displays the service result.

Step 709: The user 1 performs a gesture of laterally swiping on the touch screen of the terminal 510-1 to indicate that the service result is not satisfactory.

Step 710: The terminal 510-1 sends the negative feedback of the user 1 on the service result to the server 530.

Step 711: The server 530 updates the neural network model for the user 1 by reducing the weights of the current search terms and replacing part of the current search terms with new search terms.

Step 712: The server 530 returns a new service result to the terminal 510-1 based on the new search terms and weights of the new search terms.

Step 713: The terminal 510-1 displays the new service result.

Step 714: The user 1 likes the new service result to indicate that the service result is satisfactory.

Step 715: The terminal 510-1 sends the positive feedback of the user 1 on the new service result to the server 530.

Step 716: The server 530 increases the weights of the current search terms.

Step 717: The user 1 closes the App.

Step 718: Repeating steps 701-705.

Step 719: The server 530 returns the service result using the previously updated neural network model.

Step 720: The terminal 510-1 displays the service result.

Step 721: The server 530 receives similar feedback from multiple users for the same service request, and updates the neural network model of the system.

Step 722: The user 2 starts the App by performing a tapping gesture on the touch screen of the terminal 510-2.

Step 723: The terminal 510-2 starts the App.

Step 724: The terminal 510-2 displays a commonly used service type list and a service request input interface.

Step 725: The user 2 selects the service type by performing a tapping gesture on the touch screen of the terminal 510-2.

Step 726: The terminal 510-2 sends a service request corresponding to the selected service type to the server 530.

Step 727: The server 530 determines the search terms and weights of the search terms by using the neural network model of the system updated in step 721.

Step 728: The server 530 returns a service result to the terminal 510-2 based on the search terms and weights of the search terms.

Step 729: The terminal 510-2 displays the service result.

Here, it should be noted that the interaction flow described above is only an example, and the actual interaction process is not limited thereof.

Based on the above method embodiment, the present disclosure provides an embodiment of an artificial intelligence based intelligent service system. The description of the following system embodiment is similar to the above description of the method, and description of the beneficial effects of the same method are not repeated. For technical details not disclosed in the system embodiment of the present disclosure, please refer to the description of the method embodiment of the present disclosure. It should be noted that the modules included in the intelligent service system described below may all be implemented in the intelligent terminal, or may all be implemented in the remote server, or may be partially implemented in the intelligent terminal, and the rest in the remote server.

Figure 8:
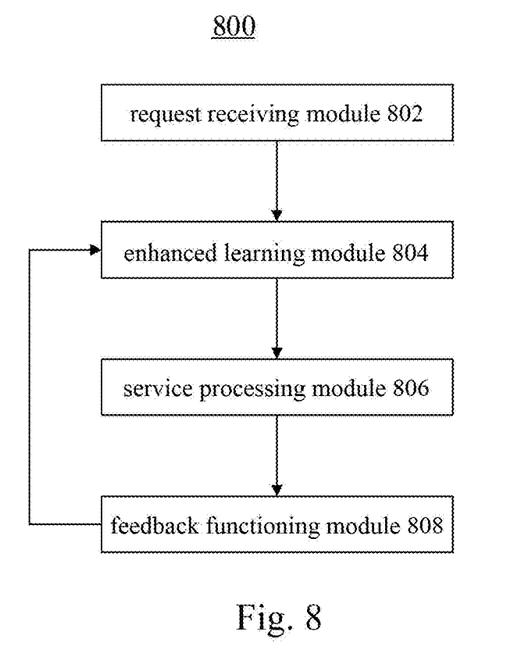
FIG. 8 is a schematic structural diagram of the artificial intelligence based intelligent service system according to the embodiments of the present disclosure.

As shown in FIG. 8, the artificial intelligence based intelligent service system includes:

A request receiving module 802, configured to receive a first service request of a user;

an enhanced learning module 804, configured to determine a search term and a weight of the search term for the first service request;

a service processing module 806, configured to provide a first service result based on the search term and the weight of the search term; and a feedback functioning module 808, configured to collect feedback of the user on the first service result to obtain evaluation information in the feedback.

The enhanced learning module 804 is further configured to adjust at least one of the search term or the weight of the search term for the first service request in real time based on the evaluation information in the feedback.

In an example, the evaluation information in the feedback may be a score or positive or negative feedback.

In an example, the service processing module may be further configured to provide a new first service result immediately based on the real-time adjusted at least one of the search term or the weight of the search term, when the evaluation information in the feedback is negative feedback or the score is lower than a predetermined threshold.

In an example, the enhanced learning module may be configured to increase and save the weight of the search term for the first service request, when the evaluation information in the feedback is positive feedback or the score is greater than or equal to a predetermined threshold.

In an example, the enhanced learning module may be configured to determine whether there is one or more other service requests other than the first service request within a predetermined time period prior to the first service request of the user, when the evaluation information in the feedback is negative feedback or the score is lower than the predetermined threshold; and adjust, when the one or more other service requests exist, at least one of the search term or the weight of the search term for the first service request in real time, based on the negative feedback or the score, in conjunction with at least one search term in the one or more other service requests.

In an example, the enhanced learning module may be further configured to acquire at least one of real-time status information or historical information of the user; and determine the search term and the weight of the search term based on a content of the first service request and the acquired at least one of the real-time status information or the historical information of the user.

In an example, the enhanced learning module may be configured to perform a text abstract space representation on the first service request based on the content of the first service request and the acquired at least one of the real-time status information or the historical information of the user; select, based on the first service request, a database retrieval mode for screening the first service result based on the first service request; and merge the text abstract space representation with an abstract space representation of the database retrieval mode to obtain the search term and the weight of the search term.

In an example, the first service result may be a list composed of a plurality of first service result entries, and the service processing module may be configured to reorder the first service result entries in the list in real time and provide the reordered list immediately, based on the real-time adjusted at least one of the search term or the weight of the search term, when the score of the feedback of the user on at least one of the first service result entries in the list is lower than the predetermined threshold or the feedback is negative.

In an example, the intelligent service system may further include: a historical information recording module (not shown) configured to record the first service request and the feedback of the user as the historical information of the user.

Figure 9:
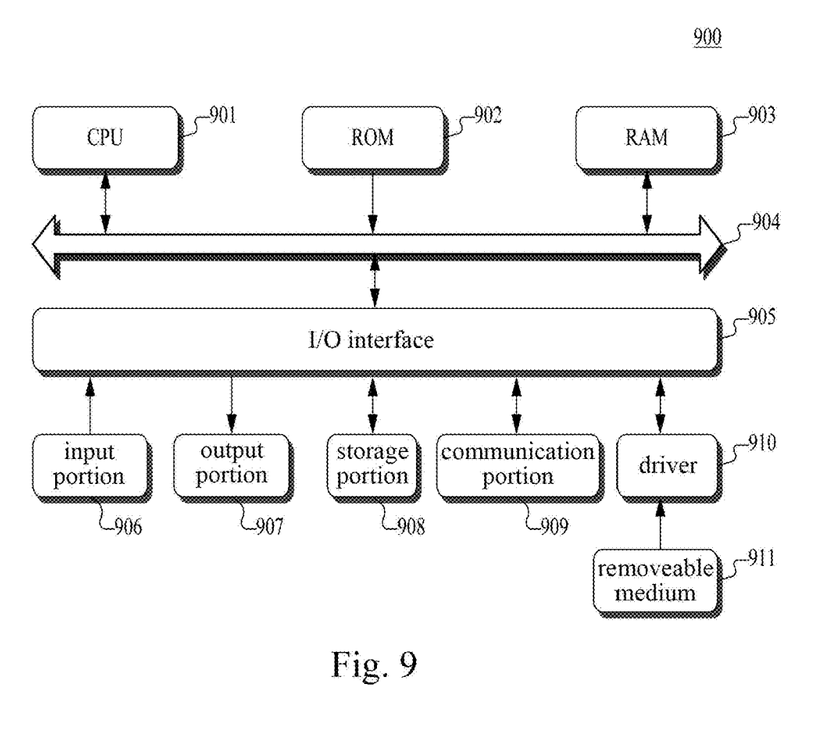
FIG. 9 illustrates a schematic structural diagram of a computer system adapted to implement a terminal device or a server of the embodiments of the present disclosure.

In an example, the intelligent service system may further include: an updating module (not shown) configured to collect first service requests and feedbacks of a plurality of users, and update the database retrieval mode based on the collected first service requests and feedbacks of the plurality of users. Referring to FIG. 9, a schematic structural diagram of a computer system adapted to implement a terminal device or a server of the embodiments of the present disclosure is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 comprising a cathode ray tube (CRT), a liquid crystal display device (LCD), a speaker etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 909, and/or may be installed from the removable media 911. The computer program, when executed by the central processing unit (CPU) 901, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In the several embodiments provided by the present disclosure, it should be understood that the disclosed device and method may be implemented in other ways. The device embodiments described above are merely illustrative. For example, the division of the unit is only a logical function division. In actual implementation, there may be another division method, such as: multiple units or components may be combined, or may be integrated into another system, or some characteristics may be ignored or not executed. In addition, the coupling, or direct coupling, or communication connection of the components shown or discussed may be indirect coupled or communication connected through some interfaces, devices or units, and may be electrical, mechanical or in other forms.

The units described above as separate components may or may not be physically separated, and the components displayed as units may or may not be physical units, that is, may be located in one place or distributed to multiple network units; some or all of the units may be selected according to actual needs to achieve the objective of the solution of the present embodiment.

In addition, the functional units in the embodiments of the present disclosure may be integrated into one processing unit, or each unit may be separately used as one unit, or two or more units may be integrated into one unit; and the integrated unit may be implemented in the form of hardware or in the form of hardware plus software functional units.

Those skilled in the art may understand that all or part of the steps of the method embodiments may be completed by using hardware related to program instructions, and the program may be stored in a computer readable storage medium. The program, when executed, performs the steps of the method embodiments. The storage medium includes: a mobile storage device, a read-only memory (ROM), a random access memory (RAM), a variety of mediums that may store program codes, such as disks or optical disks.

Alternatively, the integrated unit of the present disclosure may also be stored in a computer readable storage medium if it is implemented in the form of a software function module and sold or used as a standalone product. Based on such understanding, the technical solution of the embodiments of the present disclosure may be embodied in the form of a software product in essence or in part contributing to the prior art. The computer software product is stored in a storage medium and includes a plurality of instructions for enabling a computer device (which may be a personal computer, server, or network device, etc.) to perform all or part of the method described in the embodiments of the present disclosure. The storage medium includes: a mobile storage device, a ROM, a RAM, a variety of mediums that may store program codes, such as disks or optical disks. The above descriptions are merely specific implementations of the present disclosure, but the protection scope of the present disclosure is not limited thereto. Any variations or replacements that can be easily conceived of by those skilled in the art within the technical scope disclosed by the present disclosure shall be encompassed by the protection scope of the present disclosure. Therefore, the protection scope of the present disclosure shall be subject to the protection scope of the claims.

What is claimed is:

1. A computer-implemented artificial intelligence based method for providing intelligent service, applied to an intelligent service system, the method comprising:
receiving a user input, the user input including a first service request of a user;

determining, by the intelligent service system, search terms and weights of the search terms for the first service request;

searching, by the intelligent service system, in a database with the search terms and the weights of the search terms for the first service request and displaying, on a search interface for the first service request and displayed on a touch screen, a first service result for the first service request; and collecting, by the intelligent service system, feedback of the user on the first service result; and in response to determining that the feedback of the user on the first service result for the first service request is a laterally swipe gesture on the touch screen:

adjusting automatically the search terms and the weights of the search terms for the first service request in real-time immediately in response to the laterally swipe gesture on the touch screen, to obtain automatically adjusted search terms and automatically adjusted weights for the first service request, and immediately performing a new searching in the database with the automatically adjusted search terms and the automatically adjusted weights for the first service request to obtain a new first service result for the first service request, and displaying, on the search interface for the first service request and displayed on the touch screen, the new first service result for the first service request immediately, so that when the first service result for the first service request is swiped off the search interface for the first service request in response to the laterally swipe gesture on the touch screen, the new first service result for the first service request obtained by the new searching is immediately displayed on the search interface for the first service request.

2. The method according to claim 1, wherein the method is implemented on an intelligent terminal or a remote computer device communicatively connected to the intelligent terminal.

3. The method according to claim 1, further comprising: increasing and saving a weight of a search term in the search terms for the first service request, in response to evaluation information in the feedback being a positive feedback or a score being greater than or equal to a predetermined threshold.

4. The method according to claim 1, wherein the adjusting the search terms and the weights of the search terms in real-time comprises:

determining whether there is one or more other service requests other than the first service request within a predetermined time period prior to the first service request of the user, in response to evaluation information in the feedback being that a score is lower than a predetermined threshold; and in response to the one or more other service requests existing, adjusting the search terms and the weights of the search terms for the first service request in real-time, based on negative feedback or the score and in conjunction with at least one search term in the one or more other service requests.

5. The method according to claim 1, wherein the determining the search terms and the weights of the search terms comprises:

acquiring at least one of real-time status information or historical information of the user; and determining the search terms and the weights of the search terms based on a content of the first service request and the acquired at least one of the real-time status information or the historical information of the user.

6. The method according to claim 5, wherein the determining the search terms and the weights of the search terms comprises:

performing an abstract space representation on the first service request based on the content of the first service request and the acquired at least one of the real-time status information or the historical information of the user;

selecting, based on the first service request, a database retrieval mode for screening the first service result; and merging an abstract space representation of the first service request with an abstract space representation of the database retrieval mode to obtain the search terms and the weights of the search terms.

7. The method according to claim 1, wherein the first service result is a list composed of a plurality of first service result entries, and wherein, reordering the first service result entries in the list in real-time and providing a reordered list immediately, based on the real-time adjusted at least one of the search terms or the weights of the search terms, in response to a score of the feedback of the user on at least one of the first service result entries in the list being lower than a predetermined threshold or the feedback being negative.

8. An artificial intelligence based intelligent service system, comprising:

at least one processor; and a memory storing instructions, the instructions when executed by the at least one processor, cause the at least one processor to perform operations, the operations comprising:

receiving a user input, the user input including a first service request of a user;

determining search terms and weights of the search terms for the first service request;

searching in a database with the search terms and the weights of the search terms for the first service request and displaying a first service result for the first service request on a search interface for the first service request, the search interface for the first service request being displayed on a touch screen; and collecting feedback of the user on the first service result; and in response to determining that the feedback of the user on the first service result for the first service request is a laterally swipe gesture on the touch screen:

adjusting automatically the search terms and the weights of the search terms for the first service request in real-time immediately in response to the laterally swipe gesture on the touch screen, to obtain automatically adjusted search terms and automatically adjusted weights for the first service request, and immediately performing a new searching in the database with the automatically adjusted search terms and the automatically adjusted weights for the first service request to obtain a new first service result for the first service request, and displaying, on the search interface for the first service request and displayed on the touch screen, the new first service result for the first service request immediately, so that when the first service result for the first service request is swiped off the search interface for the first service request in response to the laterally swipe gesture on the touch screen, the new first service result for the first service request obtained by the new searching is immediately displayed on the search interface for the first service request.

9. The system according to claim 8, wherein the operations further comprise:
increasing and saving a weight of a search term in the search terms for the first service request, in response to evaluation information in the feedback being a positive feedback or a score being greater than or equal to a predetermined threshold.

10. The system according to claim 8, wherein the adjusting the search terms and the weights of the search terms in real-time comprises:
determining whether there is one or more other service requests other than the first service request within a predetermined time period prior to the first service request of the user, in response to evaluation information in the feedback being that a score is lower than a predetermined threshold; and
adjusting, in response to the one or more other service requests existing, the search terms and the weights of the search terms for the first service request in real-time, based on negative feedback or the score, in conjunction with at least one search term in the one or more other service requests.

11. The system according to claim 8, wherein the determining the search terms and the weights of the search terms comprises:
acquiring at least one of real-time status information or historical information of the user; and
determining the search terms and the weights of the search terms based on a content of the first service request and the acquired at least one of the real-time status information or the historical information of the user.

12. The system according to claim 11, wherein the determining the search terms and the weights of the search terms comprises:
performing a text abstract space representation on the first service request based on the content of the first service request and the acquired at least one of the real-time status information or the historical information of the user;
selecting, based on the first service request, a database retrieval mode for screening the first service result based on the first service request; and
merging the text abstract space representation with an abstract space representation of the database retrieval mode to obtain the search terms and the weights of the search terms.

13. The system according to claim 8, wherein the first service result is a list composed of a plurality of first service result entries, and
wherein, reordering the first service result entries in the list in real-time and provide a reordered list immediately, based on the real-time adjusted at least one of the search terms or the weights of the search terms, in response to a score of the feedback of the user on at least one of the first service result entries in the list being lower than a predetermined threshold or the feedback being negative.

14. An artificial intelligence based intelligent terminal, comprising an interface device interacting with a user and a compiling device connected to the interface device, the compiling device comprising:
a memory; and
a processor connected to the memory;
wherein the processor is configured to receive a user input, the user input including a first service request of the user; determine search terms and weights of the search terms for the first service request; search in a database with the search terms and the weights of the search terms for the first service request and display a first service result for the first service request on a search interface for the first service request, the search interface for the first service request being displayed on a touch screen; and collect feedback of the user on the first service result; and in response to determining that the feedback of the user on the first service result for the first service request is a laterally swipe gesture on the touch screen, adjust automatically the search terms and the weights of the search terms for the first service request in real-time immediately in response to the laterally swipe gesture on the touch screen, to obtain automatically adjusted search terms and automatically adjusted weights for the first service request, immediately perform a new searching in the database with the automatically adjusted search terms and the automatically adjusted weights for the first service request to obtain a new first service result for the first service request, and display, on the search interface for the first service request and displayed on the touch screen, the new first service result for the first service request immediately, so that when the first service result for the first service request is swiped off the search interface for the first service request in response to the laterally swipe gesture on the touch screen, the new first service result for the first service request obtained by the new searching is immediately displayed on the search interface for the first service request.

15. A non-transitory computer storage medium, storing computer readable instructions executable by a processor, the computer readable instructions, when executed by the processor, the processor implements an artificial intelligence based method for providing intelligent service according to claim 1.

16. The method according to claim 1, wherein the method further comprises:
presenting the first service result for the first service request on a touch screen of an intelligent terminal.

17. The method according to claim 1, wherein the method further comprises:
receiving the first service request of the user at an intelligent terminal.

18. The method according to claim 1, wherein the adjusting automatically the search terms and the weights of the search terms for the first service request comprises:
the adjusting automatically the search terms and the weights of the search terms for the first service request by reducing a weight of a search term in the search terms for the first service request and replacing part of the search terms for the first service request with new search terms.

19. The method according to claim 1, wherein the search interface for the first service request and displayed on a touch screen is a search interface of an application (APP) or a browser.

20. The method according to claim 1, wherein the method further comprises:
in response to determining that no operation on the first service result is received within a predetermined time period:

the adjusting automatically, by the intelligent service system, the search terms and the weights of the search terms for the first service request including reducing the weight of the search term in the search terms for the first service request in real-time, to obtain the adjusted search terms and adjusted weights for the first service request, and performing the new searching in the database with the automatically adjusted search terms and the adjusted weights to obtain the new first service result for the first service request and displaying, on the search interface for the first service request and displayed on the touch screen, the new first service result for the first service request immediately.

21. The method according to claim 1, wherein in response to determining that the feedback of the user on the first service result is the laterally swipe gesture on the touch screen, the method further comprises:

updating a system parameter of the intelligent service system in real-time based on evaluation information in the feedback to obtain an updated intelligent service system, and the adjusting automatically the search terms and the weights of the search terms for the first service request, comprises:

the adjusting automatically, by the updated intelligent service system, the search terms and the weights of the search terms for the first service request, and the performing a new searching in the database with the automatically adjusted search terms and the adjusted weights, comprises:

performing, by the updated intelligent service system, a new searching in the database with the automatically adjusted search terms and the adjusted weights.

* * * * *